United States Patent
White et al.

[11] Patent Number: 6,155,941
[45] Date of Patent: Dec. 5, 2000

[54] HYDRAULIC TENSIONER HAVING A FLEXIBLE BLADE ARM

[75] Inventors: David C. White; Michael Marsh, both of Dryden, N.Y.

[73] Assignee: BorgWarner Inc., Troy, Mich.

[21] Appl. No.: 09/212,138

[22] Filed: Dec. 15, 1998

[51] Int. Cl.[7] ............................... F16H 7/08; F16H 7/18
[52] U.S. Cl. .......................... 474/110; 474/111; 474/140
[58] Field of Search .................................. 474/110, 109, 474/111, 117, 133, 136, 135, 140

[56] References Cited

U.S. PATENT DOCUMENTS

| | | | |
|---|---|---|---|
| 3,276,282 | 10/1966 | Duncan | 74/242.11 |
| 3,455,178 | 7/1969 | Ruoff et al. | 474/110 |
| 3,463,025 | 8/1969 | Turner et al. | 74/242.11 |
| 3,490,302 | 1/1970 | Turner et al. | 74/242.11 |
| 4,713,043 | 12/1987 | Biedermann | 474/111 |
| 4,826,468 | 5/1989 | Friedrichs | 474/111 X |
| 4,889,087 | 12/1989 | Bergsten | 474/110 |
| 4,921,472 | 5/1990 | Young | 474/111 |
| 5,055,088 | 10/1991 | Cradduck et al. | 474/111 |
| 5,266,066 | 11/1993 | White | 474/111 |
| 5,286,234 | 2/1994 | Young | 474/111 |
| 5,462,493 | 10/1995 | Simpson | 474/111 |
| 5,653,652 | 8/1997 | Simpson | 474/111 |
| 5,711,732 | 1/1998 | Ferenc et al. | 474/111 |
| 5,720,682 | 2/1998 | Tada | 474/101 X |
| 5,730,673 | 3/1998 | Schnupke et al. | 474/111 X |

FOREIGN PATENT DOCUMENTS

| | | |
|---|---|---|
| 288446 | 11/1994 | Japan . |
| 315894 | 11/1999 | Japan . |
| 907983 | 5/1958 | United Kingdom . |

*Primary Examiner*—David A. Bucci
*Assistant Examiner*—Marcus Charles
*Attorney, Agent, or Firm*—Sidley & Austin; Greg Dziegielewski

[57] ABSTRACT

A chain tensioner system having a hydraulic tensioner and a tensioner arm with a spring blade. A hydraulic tensioner applies force against the end of the tensioner arm. The arm is pivotally supported at one end and supported by the tensioner piston at the other end. A blade spring into inserted into the plastic shoe to provide tension to the arm.

2 Claims, 2 Drawing Sheets

HYDRAULIC TENSIONER HAVING A FLEXIBLE BLADE ARM

Reference is made to U.S. Pat. No. 5,653,652 entitled "Hydraulic Tensioning System With Dual Arm Blade," the subject matter of which relates to the present invention, and which is incorporated herein by reference.

BACKGROUND OF THE INVENTION

This invention relates to tensioners used with chain drives in automotive timing applications and more particularly to a hydraulic tensioner having a blade-type tensioner arm.

Tensioning devices are used as a control device for a power transmission chain as the chain travels between a plurality of sprockets. Generally, it is important to impart and maintain a certain degree of tension to the chain to prevent noises or slippage. Prevention of slippage is especially important in the case of a chain driven camshaft in an internal combustion engine because slippage may alter the camshaft timing by several degrees, possibly causing damage. In the harsh environment in which an internal combustion engine operates, chain tension can vary between excessively high or low levels as a result of the wide variations in temperature and differences between the coefficients of linear expansion among the various parts of the engine, including the chain and the tensioner. Camshaft and crankshaft induced torsional vibrations cause chain tension to vary considerably. This tension variation results in chain elongation. Moreover, wear of the chain components during prolonged use can cause elongation of the chain that results in a decrease in the tension of the chain.

Generally, blade-type chain tensioners use a blade spring interlocked under tension with a single shoe to provide tension to a chain. The blade spring is arcuate in shape and the shoe is relatively flat. The shoe is constructed from a semi-rigid material which will deform or "creep" upon experiencing a load at a high temperature. The blade spring is flattened to correspond to the shape of the shoe and then interlocked with it. Because the semi-rigid shoe prevents the blade spring from returning to its original more arcuate shape, the blade spring applies a load to the shoe.

During operation, as the heat from the engine causes the temperature of the shoe to increase and become less rigid, the load from the blade spring causes the shoe to deform to a more arcuate shape. Through such deformation, tension is provided to a chain. The chain tensioner assembly is positioned along a free length of the chain between the sprockets. As the blade spring forces the shoe into a more arcuate shape, the apex of the shoe extends farther into the span of chain thereby increasing chain tension.

Typical blade-type chain tensioners have interlocked a blade spring to a single shoe. For example, U.S. Pat. No. 3,490,302, to Turner et al., U.S. Pat. No. 4,921,472, to Young et al., and U.S. Pat. No. 5,055,088, to Cradduck et al., each disclose a blade-type tensioner having a blade spring mechanically interlocked with a shoe. U.S. Pat. No. 5,266,066, to White discloses a blade-type chain tensioner in which a blade spring is constructed from a simple rectangular metal band formed into an arcuate shape and interlocked within a pocket in a shoe to provide a load to the shoe.

U.S. Pat. No. 5,462,493 addresses the limited arcuate range and oscillation problems of these single blade tensioners by providing two chain tensioner shoes in an overlapping configuration. One shoe imparts tension to the chain, while the other shoe damps the movement of the first shoe to reduce the oscillations. The overlapping shoe configuration also allows a greater range of arcuate movement so that the chain tensioner is able to meet the greater transverse movement associated with a longer center length timing chain.

U.S. Pat. No. 5,653,652 provides for the two chain tensioner arms in an overlapping configuration, as referred to in U.S. Pat. No. 5,462,493, but also adds a hydraulic tensioner against the arms in order to provide a system with greater range of tensioning.

One problem associated with the tensioning system of U.S. Pat. No. 5,653,652, in certain types of timing chain configurations, is the set geometry provided by the system throughout its range of operation. Maintenance of contact between the chain and the tensioner arm is essential to maintain control of a chain system. In systems of fixed geometry, the contact area between these two elements (chain and tensioner arm) changes depending on the position or articulation of the tensioner arm.

On chain systems with particularly short center distances, the fixed geometry is often such that the contact patch (or portion of the tensioner arm contacted by the chain) must be very short in any position of the tensioner so that the contact can be maintained throughout the life of the tensioner system as the patch moves along the arm due to wear over the life of the system. The present invention attempts to provide a longer contact patch throughout the life of the tensioner system since the tensioner arm can conform to the geometry of the chain strand at various positions.

Another problem faced by systems of U.S. Pat. No. 5,653,652, in certain timing system configurations, arises due to slap or contact as the chain impacts the tensioner arm. Slap by the chain against the arm can cause pitting and material removal from the arm, which quickly leads to failure of the arm surface. The present invention provides a flexible arm that travels with and conforms to the path of the chain to minimize or eliminate impact in the form of slap or contact.

SUMMARY OF THE INVENTION

The present invention relates to a chain tensioner system having a blade style tensioner arm with a hydraulic tensioner. A tensioner is required on an automotive timing drive (chain or belt) to take up the slack as the chain wears and to take up chain stretch as the engine speed increases. The tensioner must be able to hold the force of the chain against the guide arm as the chain tension increases due to the cam and crank torsional oscillations.

The present invention utilizes a hydraulic tensioner to apply force against the free end of the tensioner arm. In the system of the present invention, the arm is supported in two places, i.e., at the pivot point and against the tensioner piston. A blade spring is located inside the body of the tensioner arm.

The tensioner of the present invention finds particular application in timing drives that have short center distances between shafts. Additionally, in balance shaft drives, often the chain is required to wrap the backside of a sprocket adjacent another sprocket. In such systems, it is difficult to package a traditional solid tensioner arm and maintain acceptable system geometry. The present invention utilizes a flexible plastic tensioner arm that includes a flat blade spring. The blade spring provides shape to the plastic as the temperature of the system increases and supplies a surface for which the hydraulic tensioner can be positioned against.

DETAILED DESCRIPTION OF THE PREFERRED EMBODIMENTS

Figure 1:
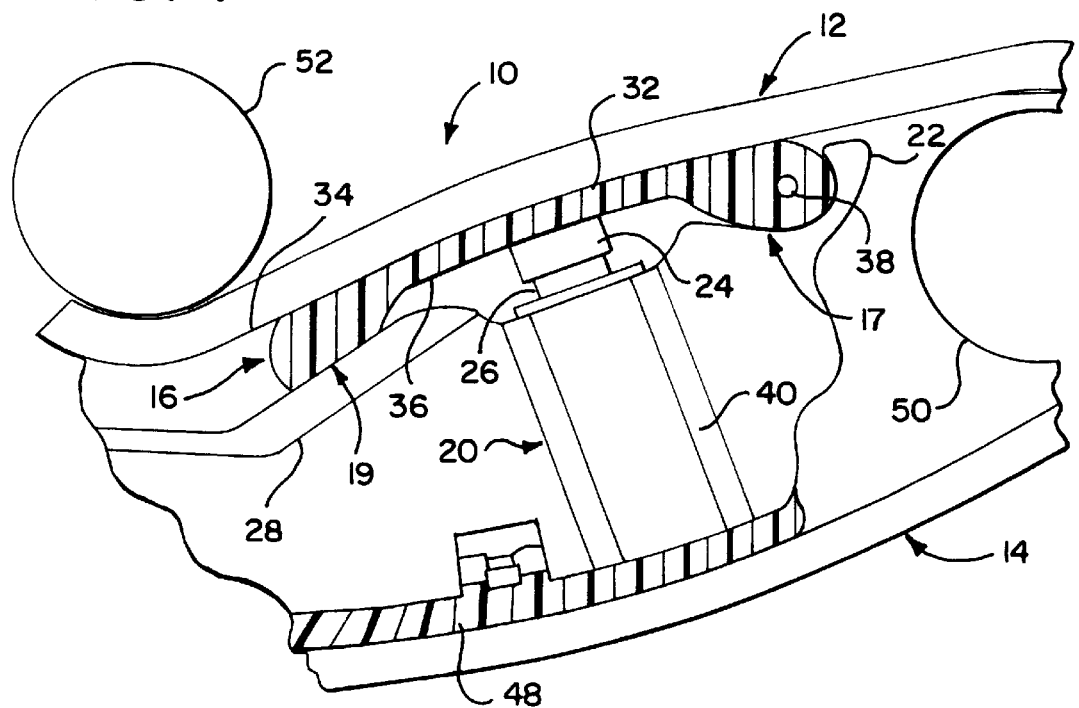
FIG. 1 is a side view of the tensioning system of the present invention illustrating the hydraulic tensioner with flexible tensioner arm with a spring blade.

Turning now to the drawings, FIG. 1 depicts a preferred embodiment of the system of the present invention having a hydraulic tensioner with a flexible tensioner arm with a blade spring. FIG. 1 shows an embodiment of the present invention installed adjacent to a chain 10, which is shown schematically. The chain includes two strands, 12, 14, which each contact opposite sides of the tensioner.

The tensioning system of the present invention includes arm 16 and a hydraulic tensioner 20. One end 17 of the arm is pivotally attached to a support 22, which forms part of the tensioner housing. The center portion of the arm 16 is supported by upper portion 24 of the piston 26 of the hydraulic tensioner 20. The free end 19 of the arm 16 is supported by another housing support 28.

The arm 16 is positioned so that its upper side 32 is against the underside 34 of the chain strand 12. The bottom side 36 of the arm 16 is positioned against the upper side 24 of the tensioner piston. One end 17 of the arm 16 has a single pivot about point 38, while the other end 19 is free and can slide along support 28.

Figure 4:
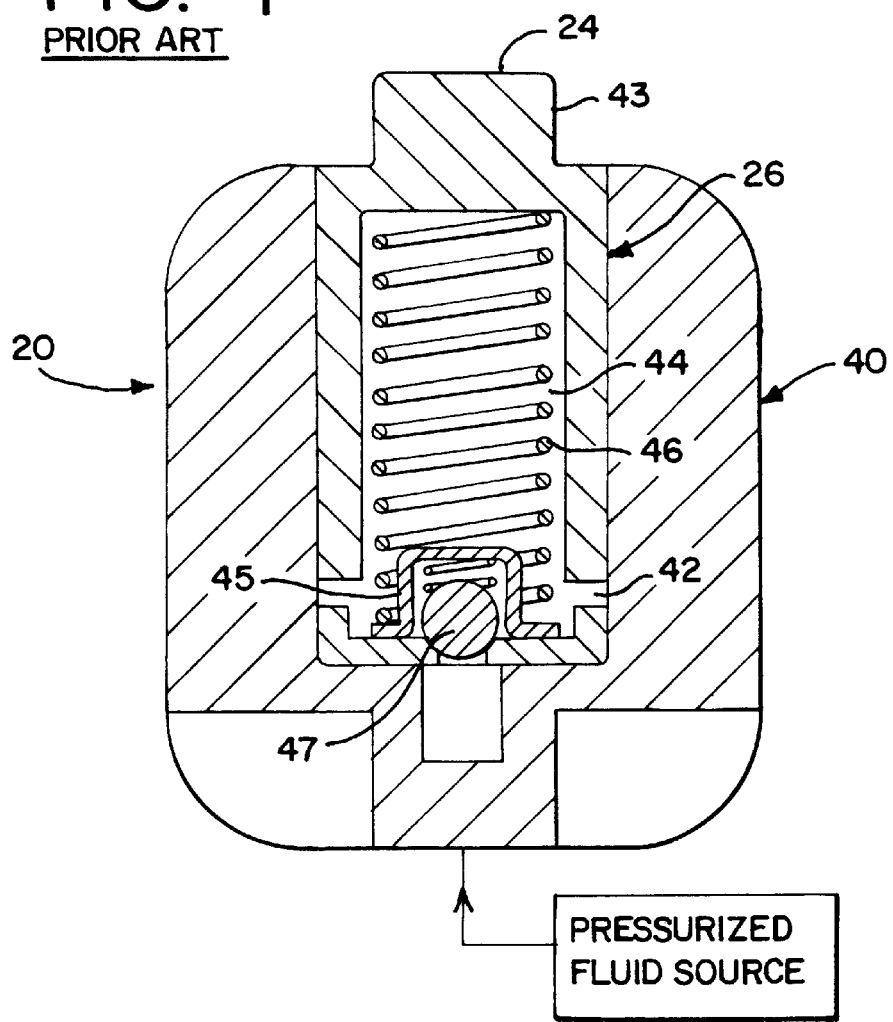
FIG. 4 is a sectional view of a conventional hydraulic tensioner of the prior art, which is used in the system of the present invention.

A conventional hydraulic tensioner of the prior art, which can be utilized with the system of the present invention, is shown in FIG. 4. Such a tensioner is also shown in Hunter U.S. Pat. No. 5,346,436, which is incorporated herein by reference. The hydraulic tensioner 20 includes a piston 26. The piston extends upward to apply pressure on the center portion and free end 19 of the arm 16. A tensioner 20, as shown, typically includes a housing 40 having a central bore 42 that forms a fluid chamber 44 with the interior of the piston 26. The fluid chamber 44 is supplied with fluid through a passageway from a pressurized fluid source (not shown). The fluid source may be an oil pump or a reservoir. Fluid travels into the fluid chamber through a one-way check valve 45 (shown with ball 47). Check valves are well-known in the tensioner art. A spring 46 contacts the inside of the piston 26 causing the piston to be biased or move axially in a protruding or outward direction from the housing bore. The upper end 43 of the piston 26 contacts the arm 16 to provide tension on the arm which in turn applies tension along the chain strand 12. The second chain strand 14 travels along a stationary arm 48 or path at the bottom of the tensioner housing.

The pivot point 38 of the arm 16 is the rotation point for the arm. The arm 16 is pinned, or otherwise secured, against the engine at point 38.

Figure 3:
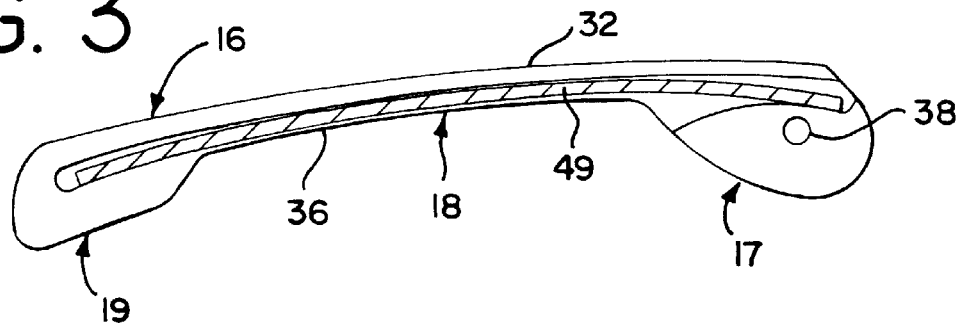
FIG. 3 is a side sectional view of one embodiment of the tensioner arm illustrating the blade.

A blade, shown more clearly in FIG. 3, is inserted in arm 16. The flexible, metal blade increases the rigidity of the tensioner arm 16 also helps the plastic arm 16 maintain its shape. Preferably, the blade has a normally arcuate shape that imparts tension to the arm.

Figure 2:
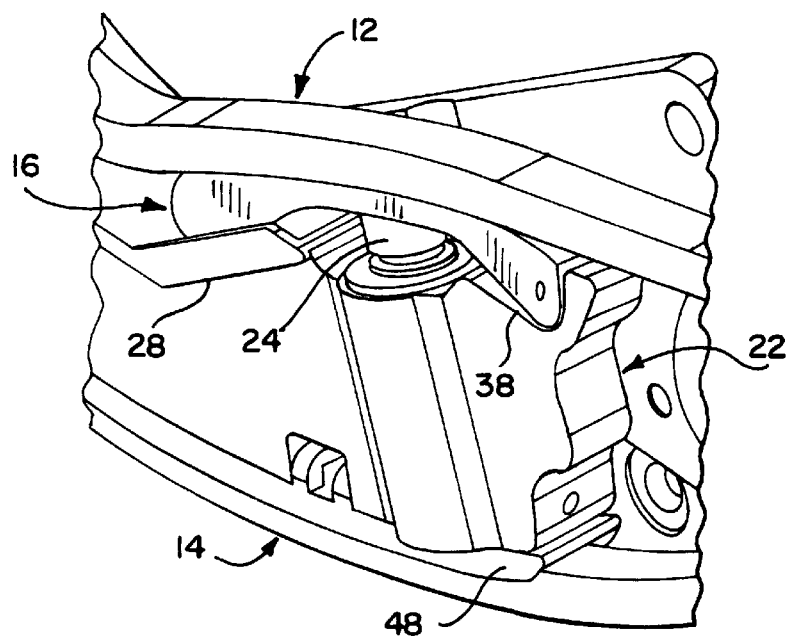
FIG. 2 is a perspective view of the tensioning system of FIG. 1.

FIGS. 1 and 2 depict one embodiment of the system of the present invention in an engine balance shaft system between two sprockets. The balance shaft system has a short center distance between the two crankshaft sprocket and balance shaft sprocket and thus requires a shortened tensioner to be inserted between the two chain strands 12, 14.

The movement of the crankshaft sprocket 50, forces the chain 10 and the respective strands 12 and 14 into motion. One chain strand is the slack side while the other chain strand is the tight side. The tight side is the portion or span of chain that is in tension between the driving and the driven sprockets. The slack side is the portion of the chain that is leaving the driving sprocket and entering the driven sprocket. The piston and hydraulic tensioner are conventionally located on the slack side of the chain.

In the embodiment shown in FIG. 1, the chain strand 12 wraps about a balance shaft sprocket 52. Alternately, the chain strands 12, 14 can be wrapped about two camshaft sprockets in a cam-to-cam drive of a dual overhead camshaft engine timing system.

In operation, upon start-up, the piston of the hydraulic tensioner is biased outward by the spring, which causes the check valve to open to permit fluid to enter the fluid chamber. As the chain tightens, the inward force of the chain is balanced by the resisting force of the spring and hydraulic fluid that fills the chamber. Once the forces are relatively balanced, the check valve closes and no more fluid enters the chamber. The piston acts outwardly against the center or the free end of the tensioner arm. The tensioner arm pivots about the pivot point 38 and moves outward by the force of the piston. As the chain continues to move across the surface of the arm, the temperature of the arm increases, which causes the blade spring to bend and assist in maintaining tension in the chain.

Those skilled in the art to which the invention pertains may make modifications and other embodiments employing the principles of this invention without departing from its spirit or essential characteristics, particularly upon the foregoing teachings. The described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. An engine timing system, comprising:

a pair of sprockets, said sprockets including a driving sprocket and a driven sprocket, said sprockets being interconnected by an endless chain, said chain including a tight strand portion and a slack strand portion, a tensioning arm member located along said slack strand of said chain, said tensioning arm member including a flexible shoe with an upper surface and a lower surface, said flexible shoe having a first end pivotally attached to a first support surface and a second end free to slide along a second support surface, said upper surface of said flexible shoe being positioned to impart tension to said chain, said flexible shoe having a blade spring member with said flexible shoe and said blade spring member imparting a load to said flexible shoe to force said flexible shoe into a more arcuate shape, and a hydraulic chain tensioner positioned between said sprockets, said tensioner including:

a housing having an inner bore, a hollow piston having an upper end and a lower end, said piston lower end slidably received within said bore and forming a fluid chamber with said bore, a spring biasing the piston in an outward, protruding direction from said bore, a one-way check valve to permit the flow of fluid from an external source of pressurized fluid through said valve and into said fluid chamber and limit the flow of fluid in the reverse direction, said upper end of said piston being biased against said lower surface of said flexible shoe, wherein said tensioner housing includes a chain guide member along an outside surface of said tensioner housing, said tight strand portion of said chain traveling along said chain guide member.

2. The engine timing system of claim 1 wherein said slack portion of said chain travels along said upper surface of said shoe.

\* \* \* \* \*